US009417851B2

(12) United States Patent
Lane

(10) Patent No.: US 9,417,851 B2
(45) Date of Patent: Aug. 16, 2016

(54) LOCATION-BASED APPLICATION DEVELOPMENT FOR RUNTIME ENVIRONMENTS

(75) Inventor: Thomas Lane, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1318 days.

(21) Appl. No.: 12/465,251

(22) Filed: May 13, 2009

(65) Prior Publication Data

US 2013/0326474 A1 Dec. 5, 2013

(51) Int. Cl.
*G06F 9/44* (2006.01)
*G06F 9/455* (2006.01)

(52) U.S. Cl.
CPC .. *G06F 8/30* (2013.01); *G06F 8/20* (2013.01); *G06F 8/34* (2013.01); *G06F 9/45504* (2013.01)

(58) Field of Classification Search
CPC ............... G06F 8/20; G06F 8/30; G06F 8/34
USPC ........................................................ 717/107
See application file for complete search history.

(56) References Cited

U.S. PATENT DOCUMENTS

| 7,614,051 B2* | 11/2009 | Glaum et al. ................. 717/175 |
| 7,730,099 B2* | 6/2010 | George et al. ................. 707/796 |
| 8,499,311 B2* | 7/2013 | Blohm ................ G06F 9/44526 709/202 |
| 2003/0101431 A1* | 5/2003 | Duesterwald et al. ........ 717/111 |
| 2003/0126559 A1* | 7/2003 | Fuhrmann ..................... 715/513 |
| 2005/0108678 A1* | 5/2005 | Goodwin et al. ............. 717/100 |
| 2005/0204351 A1* | 9/2005 | Jiang et al. .................... 717/162 |
| 2005/0283574 A1* | 12/2005 | O'Neil ........................... 711/137 |
| 2006/0129906 A1* | 6/2006 | Wall .............................. 715/500 |
| 2006/0294063 A1* | 12/2006 | Ali et al. ........................... 707/3 |
| 2007/0180432 A1* | 8/2007 | Gassner ................... G06F 9/06 717/136 |
| 2008/0005681 A1* | 1/2008 | Cohen et al. .................. 715/762 |
| 2008/0071657 A1* | 3/2008 | Matic .............................. 705/35 |
| 2009/0064020 A1* | 3/2009 | Morris .......................... 715/765 |
| 2010/0031235 A1* | 2/2010 | Volkov .......................... 717/120 |

OTHER PUBLICATIONS

Kevin Lynch, Making Rich Internet Apps Web-Friendly, available at http://www.kylnch.com/archives/000076.html (last accessed May 8, 2009).
Kevin Lynch, Using Browser States, available at http://www.klynch.com/apps/flashlinking/howto.html (last accessed May 8, 2009).

* cited by examiner

*Primary Examiner* — Li B Zhen
*Assistant Examiner* — Bradford Wheaton
(74) *Attorney, Agent, or Firm* — Kilpatrick Townsend & Stockton LLP

(57) ABSTRACT

A runtime environment can access code data defining an application comprising a persistent component comprising code for a user interface element and referencing a navigation action, a location loader, and a plurality of location components. Each location component can comprise executable code for child contents for providing a respective view of the application. A first view of the application can be provided by loading code of a first location component into memory via the location loader and executing code of the child contents of the first location component via the runtime environment. In response to receiving a navigation command via the user interface element, a second view of the application can be provided by loading code of a second location component into memory and executing code of the child contents of the second location component via the runtime environment. The code of the first location component may be removed from memory after the navigation command is received.

18 Claims, 7 Drawing Sheets

```
502
<MenuBar>
<MenuItem label="Home"
onClick="loader.navigate('home')"/>
<MenuItem label="Promotions"
onClick="loader.navigate('promo', promoID=123)/>
<MenuItem label="Store"
onClick="loader.navigate('store')"/>
</MenuBar>
```

```
504
<LocationLoader id="loader" width="400"
height="400"/>
```

```
506
<Location.home>
{UI Code for home screen UI components}
</Location.home>
```

```
508
<Location.store>
{UI Code for store screen components}
</Location.store>
```

```
510
<Location.promo>
{UI Code for promo screen components}
[RequestParam]
Public var promoID:Integer:
</Location.promo>
```

512 → (MenuItem Home)
514 → (MenuItem Promotions)
516 → (MenuItem Store)

Figure 5

LOCATION-BASED APPLICATION DEVELOPMENT FOR RUNTIME ENVIRONMENTS

TECHNICAL FIELD

The disclosure below generally relates to software, particularly to programming and executing software for use in runtime environments.

BACKGROUND

Page-oriented development can be used to deliver applications via ubiquitous universal HTML document browsers. These so-called "web applications" often share one or more of the following features: little to no startup delay; loading only the view the user works with at any moment in time; simple lifecycle/construction of views: a single top-to-bottom rendering pass; views are separated by "hard breaks" (navigations) that essentially restart and recreate the client and force developers to persist the state they care about while throwing away everything else; the client essentially restarts in between every view Oust with different input parameters), resisting accumulated memory leaks, rogue processes and UT state corruption; and each view automatically gets a URL that typically can be used to reload or jump directly to it.

These qualities, combined with the tolerance of HTML browsers to syntactical errors, make web application UIs dramatically robust and resilient as compared to their fat client predecessors.

On the other hand, web applications may encourage sloppy development. Other drawbacks relate to implementing a dynamic UT in a static page model: the top-to-bottom rendering pass may sometimes be too simple for highly interactive interfaces and/or excessive page reloads may be required. Asynchronous Javascript+XML (AJAX) techniques attempt to patch some of these weak spots, but the main views themselves may remain distinct pages separated by navigations.

Another option for web-based application delivery uses platform-independent application code developed in a more traditional sense but executed via a platform-specific runtime/execution environment. For example, ADOBE® FLEX BUILDER™ is an increasingly popular development environment that makes use of the ACTIONSCRIPT™ programming language to define files that are complied for execution via ADOBEL® FLASH and/or AIR® (all available from Adobe Systems Incorporated of San Jose, Calif.).

Developers may desire to utilize the more robust execution capabilities of a runtime environment rather than a browser, but may nonetheless wish to maintain some of the advantages of page-based development.

SUMMARY

In accordance with one or more aspects of the present subject matter, runtime environments, such as those that can provide a rich client experience, can be used to provide applications with location-based behavior. Particularly, development tools and techniques can be used whereby developers can define "locations" as containers for child objects in a client-side application, with the locations navigated to during execution of the application.

For example, a computer can be configured to load and execute applications written for use with a runtime environment executed within an operating system. Particularly, the runtime environment can access code data defining an application comprising at least one persistent component. The persistent component can comprise code for a user interface element that references a navigation action. The application can further comprise code for a location loader and a plurality of location components. Each location component can comprise executable code for child contents for providing a respective view of the application. The computer can load and execute code of the persistent component(s) and generate the user interface element referencing a navigation action.

The computer can further provide a first view of the application by loading code of a first location component into memory via the location loader and executing code of the child contents of the first location component via the runtime environment. In response to receiving a navigation command via the user interface element, the computer can provide a second view of the application by loading code of a second location component into memory via the location loader and execute code of the child contents of the second location component via the runtime environment. In some embodiments, the computer removes the code of the first location component from memory after the navigation command is received.

Embodiments also include systems and computer-readable media comprising code for allowing location-based application development and functionality. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 5 is a diagram showing example source code segments defining a location loader, navigation behavior, and a plurality of locations.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

As was noted above, embodiments of the present subject matter may be useful in testing and development of runtime applications. Runtime applications may be executed in an execution environment that provides suitable support, with the term "execution environment" meant to be synonymous with runtime environment. This can be achieved in some embodiments by programming the computing apparatus to provide the execution environment. Suitable execution environments include, but are not limited to, ADOBE® FLASH® or AIR™ (both available from Adobe Systems Inc. of San Jose, Calif.).

Figure 1:
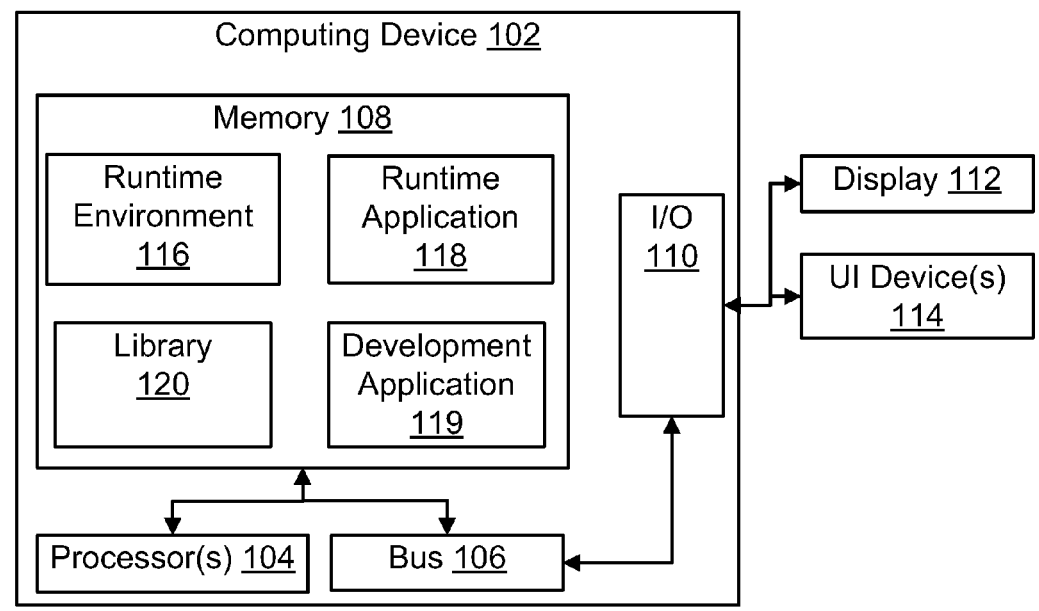
FIG. 1 is a block diagram showing an example of a computing system configured to support event-driven application development.

FIG. 1 is a block diagram showing an example of a computing system 100 configured to support location-based application development for runtime environments. In this example, system 100 includes a computing device 102 comprising one or more processors 104, a bus 106, memory 108, input-output (I/O) handling components 110, a display 112, and user input (UI) devices 114 (e.g., a mouse, keyboard, etc.). Memory 108 represents one or more computer-readable media accessible by processor(s) 104, and in this example embodies a runtime environment 116.

Memory 108 also embodies a runtime application 118 which can be produced or updated by development application or tool 119. Memory 108 may include further components or applications such as an operating system and the like.

Development application 119 may comprise a full-featured integrated development environment (IDE) in some embodiments and can include common features such as a text or graphic-based code editor, debugger, and code management capabilities, although these additional features are not included in some embodiments. In some embodiments, development application 119 comprises a compiler that can be used to convert source code segments comprising calls to location-based application activity into suitable code executable using runtime environment 116. For example, development application 119 may utilize one or more libraries 120 so that developers can reference location-based behavior quickly and easily while coding rather than defining the infrastructure for location-based loading of child contents each time a new application is developed.

However, not all embodiments utilize development application 119—for instance, use of a previously-compiled application 118 with location-based behavior does not require the functionality of development application 119.

Figure 2:
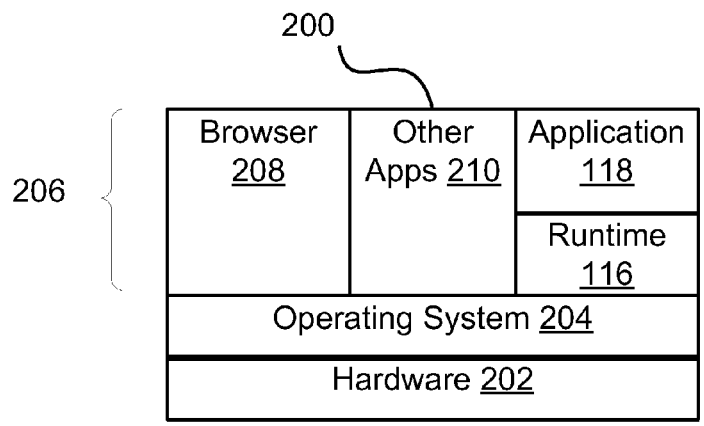
FIG. 2 is an abstraction layer diagram illustrating an example of using a runtime environment FIGS. 3A-3C each depict persistent components and respective views in example of an application with location-based functionality.

FIG. 2 is a simplified abstraction layer diagram 200 illustrating the use of a runtime environment. In this example, a base layer 202 represents computing hardware, while a second layer 204 represents an operating system. In practice, layers 202/204 may further comprise firmware, kernel, and/or virtualization layers. Application layer 206 sits on operating system layer 204 in this example. Application layer 206 in this example includes browser 208, other applications 210 (e.g., email, development tools, if used) and runtime environment 116. Runtime application 118 executes via runtime environment 116.

Runtime application 118 may be distributed in any suitable manner, e.g., as a downloadable or inline component in a web page accessed via browser 208, with the application rendered via runtime environment 117 configured as a browser plug-in. As another example, runtime environment 116 may comprise a standalone application or component independent of other applications executed in operating system 204. Application 118 may comprise a cross-platform multimedia application so that one version of application is distributed to users of multiple different computing platforms/operating systems; the details of interfacing with particular operating systems 204 can be handled via respective versions of runtime environment 116. For example, application 118 may comprise a package of one or more suitable files comprising code compiled for use with the ADOBEL® FLASH or AIR runtime environments noted above.

Application 118 can comprise additional data for use in execution such as embedded graphics, text, and other information. In some embodiments, application 118 can be used as a rich media client and obtain graphics, text, and other data from one or more data service providers to which application 118 interfaces via runtime environment 116.

Figure 3A:
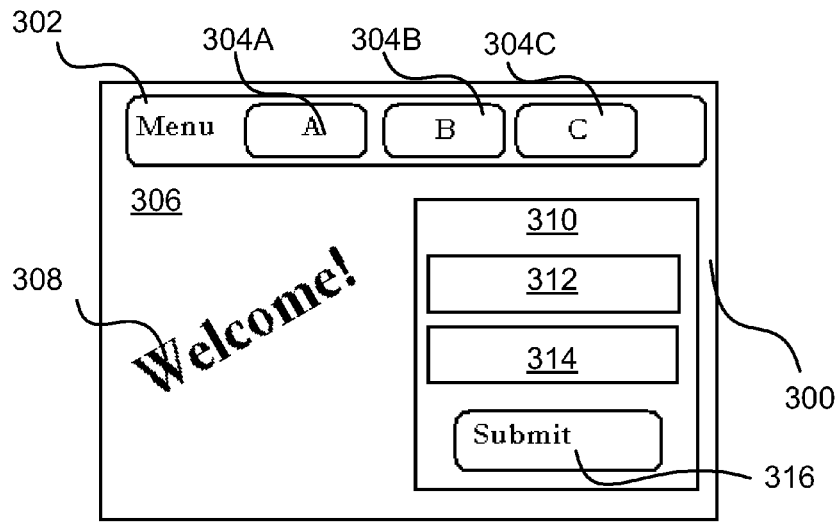
Figure 3B:
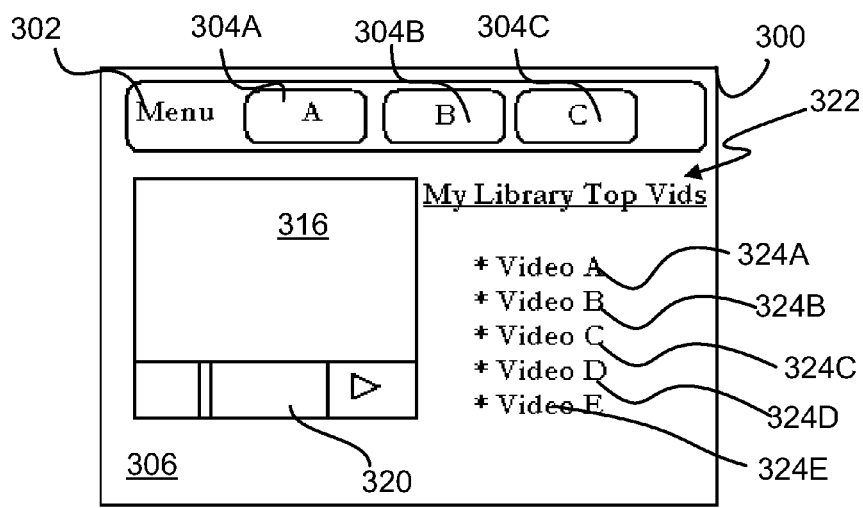
Figure 3C:
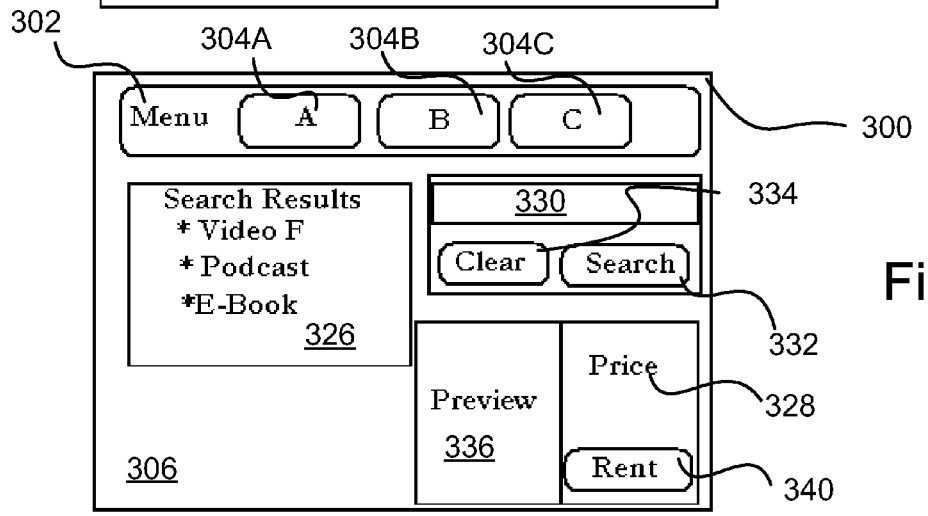

FIGS. 3A, 3B, and 3C illustrate exemplary user interfaces presented by an application 300 executed via a runtime environment. In this example, the application renders a menu bar 302 comprising three navigation buttons 304A, 304B, and 304C which are used to control which additional user interface elements shown in view area 306.

FIG. 3A depicts a first view provided by application 300 comprising a "home" screen. In the first view, view area 306 comprises a welcome graphic 308, which may comprise static or animated effects depending on the particular runtime environment capabilities. For example, welcome graphic 308 may be specified as a vector graphic object with appropriate color, position, and other properties defined in its code. View area 306 also comprises a login window 310 including username text entry area 312, password text entry area 314, and "submit" button 316. For example, a user may utilize text entry areas 312/314 to identify him or herself to an online content management system. When the user clicks button 316, the user's credentials can be passed to an authentication service to identify the user and obtain appropriate data to provide in other views.

FIG. 3B illustrates a second view in which view area 306 comprises a video player object 318 with playback controls 320. For example, the second view may comprise a "promo" screen where a user can view different videos, with the default video changing according to which video is being promoted by the provider of application 300. View area 306 also includes a listing 322 ("My Library Top Vids") with a plurality of links 324A-324E. For example, listing 322 may be returned in response to a query to the content management system for the user's favorite or most popular videos. Each link may be configured to display the corresponding video using video player object 318.

FIG. 3C illustrates a third view, such as a "store" for application 300, in which view area 306 comprises a search results listing 326, search command interface 328, preview pane 336, price indicator 338, and rent command button 340. For example, a user may provide search terms in text entry area 330 of search interface 328 and submit the search to the online content management system by clicking button 332. Search results listing 326 may depict search results returned from the online content management system, with each entry in search results listing 326 clickable to display a preview in preview pane 336 of the item along with its price at 338 and an option to rent or purchase the item by clicking button 340.

A developer may desire for each respective view of FIGS. 3A, 3B, and 3C can be selected by clicking on a respective button 304A, 304B, and 304C.

Using conventional HTML and/or AJAX techniques would be one option. For instance, a developer could define two or more frames, with one frame comprising menu bar 302 and a second frame containing display area 306. However, each state change in each view would require reloading the web page into the second frame for that view, if not the entire frameset.

For example, if a user clicked on link 324C within the view of FIG. 3B, the page would need to be reloaded so that video C was embedded in an appropriate inline video player 318. Vector graphics for the view of FIG. 3A may require yet another inline player, and some desired interface effects may be unavailable in an HTML environment. Each time a new view is needed or a current view is updated, the page would require reconstruction, e.g., via server-side scripting. AJAX techniques may be used to avoid the need for complete page reloads in some and enhanced interface effects in some, but not all circumstances.

Another option for the developer would be to write code for a rich client application. States of different components such as 308, 310, 318, 322, 326, 328, 336, 338, and other components shown in the various views could be tied to particular clicks of buttons 304. For example, clicking button 304B could set the state for the components in view area 306 of FIG. 3B to "visible" while setting the state for the components of FIG. 3A and 3B to "hidden."

In contrast to a web-based application that loads an HTML or other document into a browser as separate elements from the browser, a rich client or other application comprises a unitary package of executable code for generating UT components and obtaining data for the various views and other aspects of the application, with the data (e.g., videos, pictures, etc.) accessed via network requests and/or embedded with the application code. This may allow a developer to ensure a more consistent experience and reduce or eliminate server-side construction of UI elements. Nonetheless, this solution may not be ideal in all circumstances.

For example, an end user may needlessly endure a long delay while various unused components and associated data are loaded in to the memory space for the application. Other problems may arise from maintaining components in memory throughout execution. For instance, video player 318 may comprise third-party code with a memory leak unknown to the developer. Although the memory leak may not noticeably affect operation of the video player, the leak may lead to increasingly large amounts of memory use while the video player persists even if not in use (for example, if the user navigates to the view of FIG. 3C).

Figure 4:
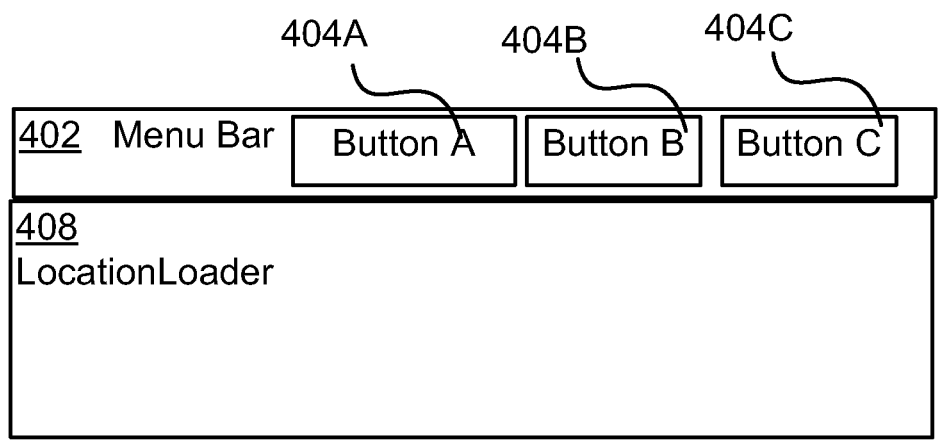
FIG. 4 is a diagram illustrating an example of coding location-based behavior into an application for a runtime environment.

FIG. 4 is a diagram illustrating an example 400 of coding location-based behavior into an application for a runtime environment. In this example, menu bar 402 is configured as a persistent component comprising a code segment identifying components 404A, 404B, and 404C, each corresponding to a respective button. Depending on the development environment, the menu bar and buttons may comprise separate components or, as in the example below, the menu bar component may include buttons in its definition. This example illustrates menu bar 402 only, but in practice numerous persistent components that are not intended to be discarded and reloaded throughout various views can be defined conventionally.

In some embodiments, persistent components comprise portions of the UT that are sometimes referred to as "chrome" and serve to frame and control the portions of the interface which load different locations. For instance, the persistent components may be linked to the locations—as an example, although menu bar 402 or other persistent components are not recreated with each navigation, its state may be changed based on a navigation activity or a particular location. As an example, if the persistent components include a first and second menu bar and the second menu bar is relevant to a first and second locations but not a third location, the second menu bar may be minimized or dimmed when the third location is loaded.

For example, the first and second menu bar may be declared to have two states, "showBoth," in which both the first and second menu bars are shown, and "showFirst," where only the first menu bar is shown (i.e., in the "showFirst" state, the second menu bar is minimized, dimmed, or otherwise de-emphasized). The states can be associated with the loading of different locations—for instance, the location loader may include a declarative API that maps the first location and second location's ID to showBoth, while the third location's ID is mapped to "showFirst."

The changing views for the application are achieved by defining a location loader 408 to load the respective components of each view in response to navigation commands. The components included in each view are appropriately associated with corresponding identifiers for the locations in the source code for the application. As noted below, for the example of FIGS. 3A-3C and FIG. 4, code for the application can be compiled so that, when the application is executed, the contents of location loader 408 are changed in response to clicks of buttons 404.

Accordingly, a developer may achieve the benefits of both location-oriented development and rich client development. For instance, executable code for the persistent components, the location loader(s), and the executable code defining the child contents for the locations may all be defined as part of the same code base and distributed as a single package of one or more executable files. This may allow a developer to control the UT experience and leverage the capabilities of a rich client while still supporting page-like navigation behavior.

In some embodiments, the contents of each location may be sufficient to provide a standalone view. That is, the user interface components comprising child contents can be specified in the same manner the components would otherwise be specified if the components were not included in a particular location. This may, for example, allow easier development and use of locations by allowing locations to be modularized. Additionally, the capabilities of the runtime environment may not need to be specifically tailored to differentiate between child components and other components.

FIG. 5 is a diagram showing example source code segments 500 defining a location loader, navigation behavior, and a plurality of locations. The code of this example is pseudo-code; it will be understood that any particular syntax can be supported through use of appropriate libraries and compiler settings/techniques.

In this example, menu bar code segment 502 includes three definitions 512, 514, 516 defining respective buttons and navigation behavior. For example, definition 512 states that when menu item "Home" receives click event ("onclick( )"), a "navigate" command is sent to LocationLoader component with an ID parameter ('home'). Similarly, menu items "Promotions" and "Store" navigate command to LocationLoader with respective ID parameters 'Promo' and 'store', respectively.

Location loader code segment 504 defines properties of location loader 408. In this example, exemplary width and height properties are provided. However, the location loader may exhibit any other suitable properties supported by the runtime environment.

Three respective source code segments 506, 508, and 510 are illustrated as respective containers Location.home, Location.store, and Location.promo. For example, each location container may include appropriate source code for providing the desired components for each view shown in FIGS. 3A-3C. For example, Location.home may include source code for generating vector graphic object 308, login window 310 with textboxes 312, 314, and button 316. Location.promo may include code for generating video player 318 and listing 322. The code for player 318 and listing 322 can also include code for making corresponding data queries to the content management service as well or those code segments may be included outside the Location.1 container. Location.store may include code segments for generating search results listing 326, search interface 328, preview pane 336, price listing 338, and rent command button 340.

In this example, clicking on menu item "Promotions" also passes a parameter to the location loader. As was noted above, a distributor of application 300 may desire to set the default view of the video player in the "Promotions" screen to a particular video of interest. This is represented in FIG. 5 at 516 by the expression "loader.navigate('promo',promoID=123)", which passes the parameter 'promoID=123' to the location loader. When Location.promo is loaded, its child contents can access the variable promoID passed to the location via the navigation request.

Figure 6:
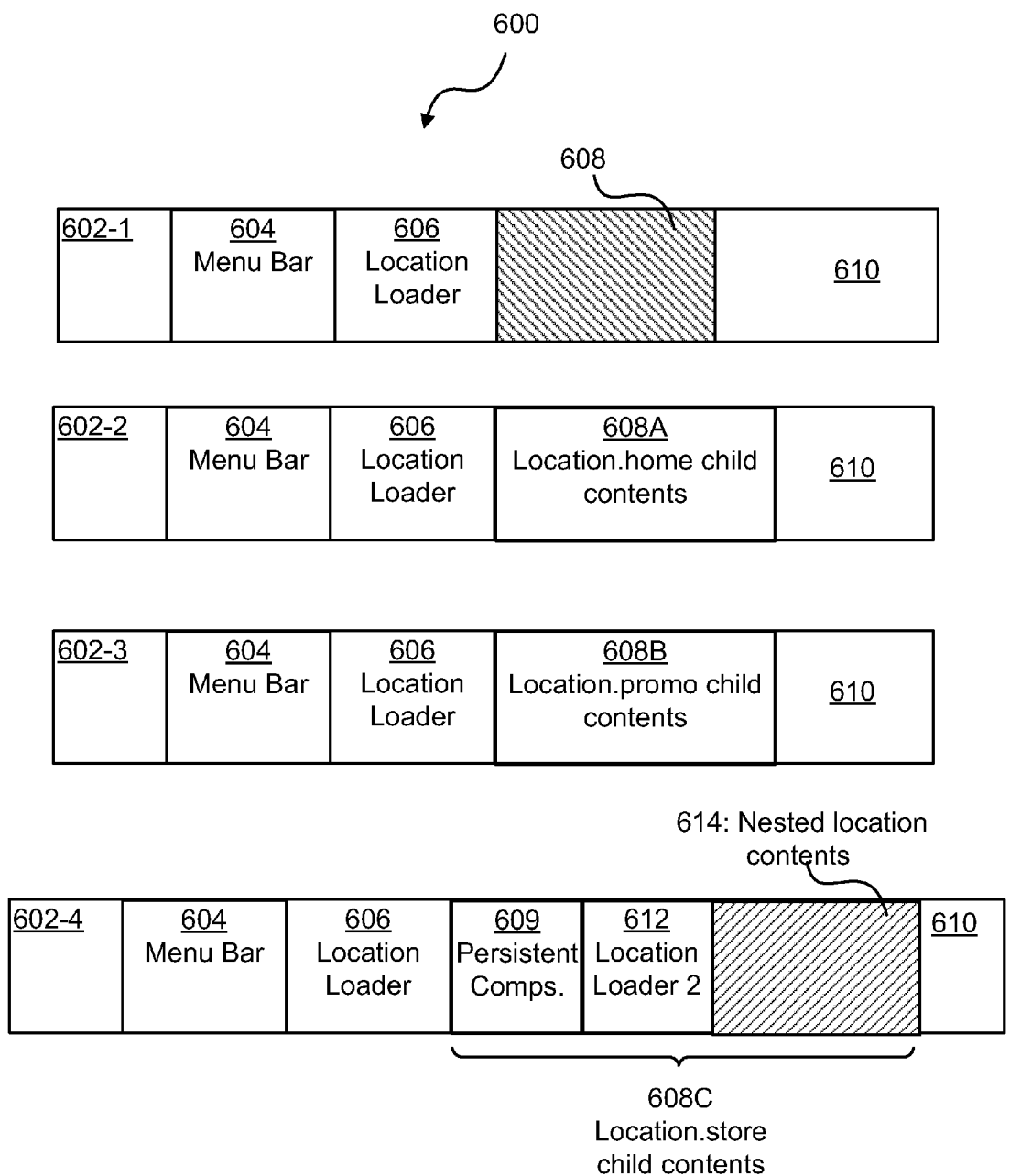
FIG. 6 is a diagram that illustrates a plurality of memory space snapshots representing an example of how memory space can be used when a location-based application is executed.

FIG. 6 is a diagram 600 that illustrates a plurality of memory space snapshots 602-1, 602-2, 602-3, and 602-4 representing a memory space used when the location-based application above is executed. As shown generally at 602-1, the memory space allocated for the application includes memory space 604 comprising object code and data structures for rendering the menu bar, buttons, and other persistent components. Memory space 606 includes object code and data structures so that the location loader looks to memory space 608 for the child contents to provide in the user interface. Location loader 606 may change the contents of memory space 608 according to which location is selected and/or may look to different memory spaces as different locations are navigated to in the course of executing the application. On the other hand, the contents of memory space 604 are loaded at the start of execution but are not destroyed/recreated in response to navigation activities.

For example, in memory space snapshot 602-2, location.home has been selected and location loader code 606 looks to memory space 608A to generate the child contents specified for location.home. In snapshot 602-3, location.promo has been selected and so location loader code 606 looks to memory space 608B containing child contents specified for location.promo. In snapshot 602-4, location loader 606 looks to memory space 608C for child contents of location.store.

In the example of snapshot 602-4, memory space 608C itself contains code for a nested location loader 612 with nested child contents generated from memory space 614. For example, the search results presented via interface 328 may be sorted into a plurality of different "pages" rather than a single list. The different pages can be loaded by providing suitable navigation commands to the nested location loader 612. For example, the search interface 328 may include selector commands to display video, podcast, and text results on different pages.

In the case of a nested location loader specified inside a location, the persistent components 609 associated with the nested location loader can be loaded when the location is first navigated to. Then, the child contents of the nested location loader can be changed in response to navigation commands from the persistent components (e.g., menu bars, etc.) at the location. If a user navigates away from the location containing the nested location and associated persistent components, both the nested location loader and persistent components associated with the nested location loader may be discarded.

Memory snapshots 602 include additional memory 610 allocated to the application, e.g., for other persistent components, non-UI components, working memory, etc. In this example, the overall memory space occupied by the application is depicted as remaining constant, but this is only for illustration only and not meant to imply a limitation.

In the examples above, the child components of location.home, location.promo, and location.store relied on request parameters and retrieved data themselves as needed. In some embodiments, context parameters can be supported whereby a location can specify data or other items that are expected to be present at loading. This may reduce load time and memory usage since components will fetch only data they need on demand and can rely on the other data that is previously loaded. Additionally, context parameters may be used to validate proper functioning of the application—for instance, if a component loaded via a location loader does not find expected parameters, the location loader may report an error and/or cancel the navigation action.

As one example of context parameters, consider a photo viewing application. A location loader may specify a picture viewing component that can display one or more pictures from a set of picture files (e.g., JPEG files) retrieved via a network request. The picture viewer may be configured to request the set of picture files when it is instantiated. However, the picture viewer may be specified in the context of an application where the picture set is expected to have been loaded prior to when the picture viewer is used.

For example, a navigation bar may comprise a persistent component used to select different locations. The picture viewer may be at one location while a picture preview component that displays a plurality of thumbnails based on the set is defined at a second location. Either or both the picture viewer or picture preview component may specify a contextual parameter indicating that the set of picture files is expected to be present. For example, the set of picture files may be loaded when the application is initialized. When a user navigates to one of the locations, the picture viewer or preview component may be initialized and begin operation rather than waiting while the picture set is loaded anew, assuming that the context parameter (e.g., Array.pictures=present) is met.

Figure 7:
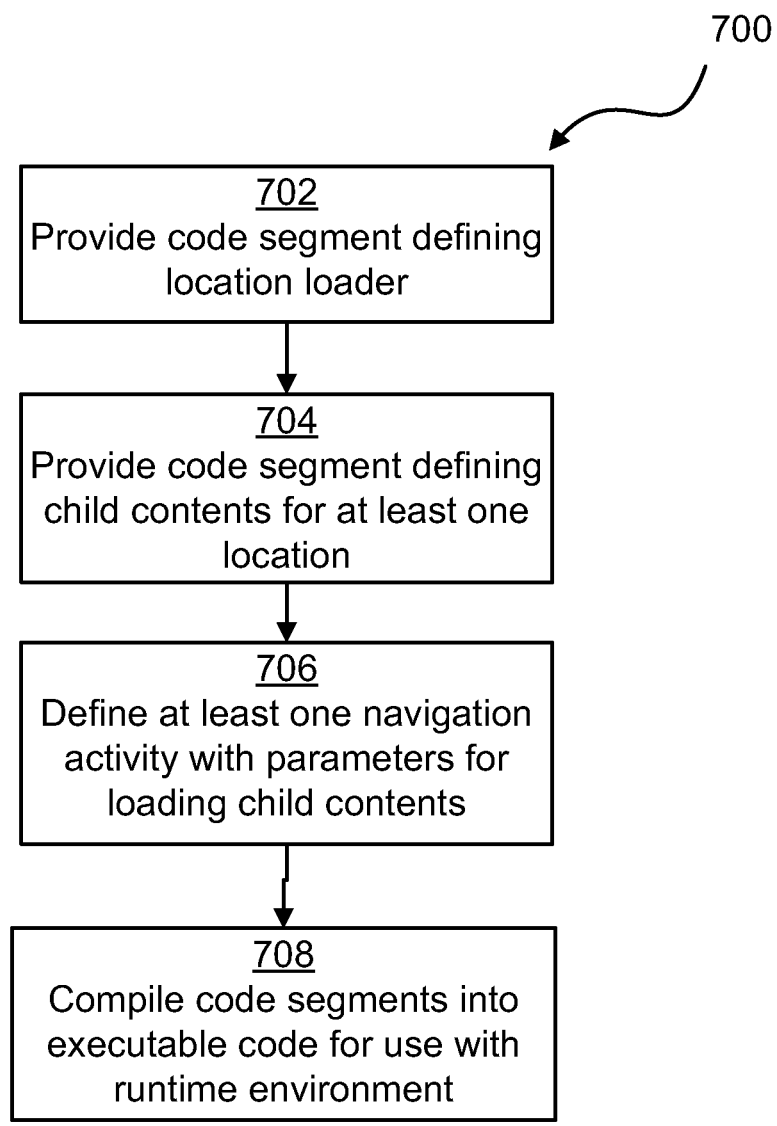
FIG. 7 is a flowchart showing steps in an exemplary method of developing a location-based application.

FIG. 7 is a flowchart showing steps in an exemplary method 700 of developing a location-based application. At block 702, one or more developers provide a code segment defining a location loader. For example, a development application may support a graphical or text-based interface for defining code for one or more location loaders.

At block 704, the developer(s) provide a code segment defining child contents for at least one location to be loaded using the location loader. For example, each location may be defined as a "container" for child contents such as code for the exemplary user interface elements noted in the examples above. The locations may be defined in the same source code file as the location loader in some embodiments or may be defined in respective source code files separate from the location loader.

At block 706, the developer(s) define at least one navigation activity with one or more parameters for loading child contents into the location loader. For example, the developer(s) may provide code segments defining one or more persistent components such as navigation/tool bars including buttons or other user interface elements usable to select desired locations. The buttons or other elements can be defined so as to pass one or more parameters to the location loader to select the appropriate location when clicked or otherwise interacted with. As another example, a navigation command may be specified within child contents of a location. For instance, a first location may include a button to navigate from the current location to another location.

As another example, a navigation command may be specified by including code that accesses data passed to the application from outside the runtime environment. For example, a location loader may be configured to access a memory location containing data relayed from a browser or other application requesting a specific view of the runtime application. The runtime application may be configured to look for a particular parameter included at execution and store the parameter at the location referenced by the location loader so that the desired view is provided when the application initializes. As another example, during execution a browser, another local application, or a server may pass navigation commands to the runtime application by relaying data identifying a requested location and/or other request parameters to the runtime application.

At block 708, the code segments are compiled into executable code for use with a runtime environment. For example, compiling may comprise accessing a library that defines the proper syntax for referencing location loaders, locations, and navigation activities. In some embodiments, the library is made available as part of a software development kit (SDK). The context of the code segments can be validated and then used to generate appropriate executable code so that, when the application is executed, the location loader selectably loads child contents in response to navigation commands.

Thus, through use of a library or other suitable component accessed when the code is compiled, the user input defining code segments is transformed into computer-executable code that provides an application featuring location-based functionality.

Figure 8:
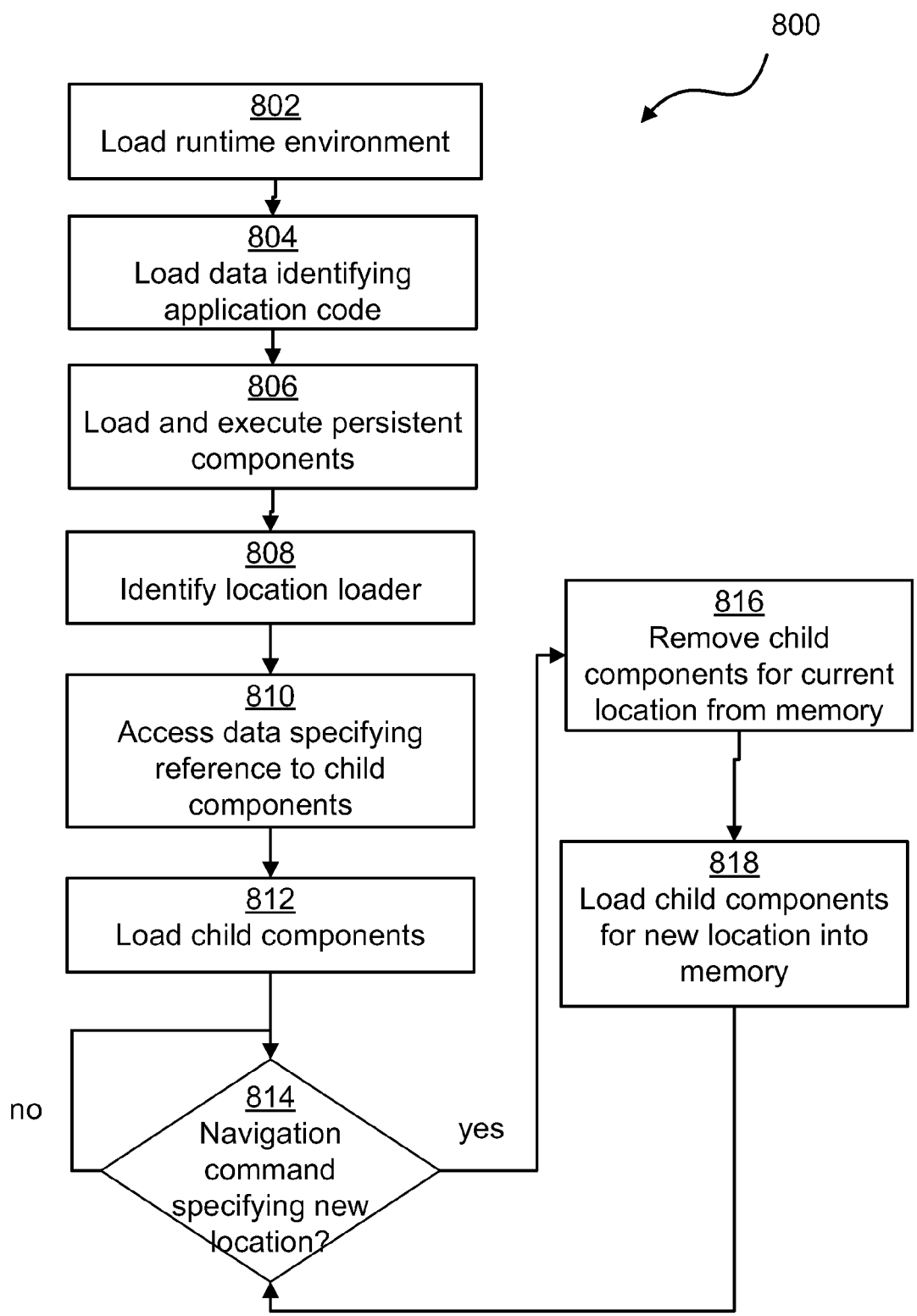
FIG. 8 is a flowchart showing exemplary steps in a method for executing a location-based application via a runtime environment.

FIG. 8 is a flowchart showing exemplary steps in a method 800 for executing a location-based application via a runtime environment. At block 802, the executable code and data structures for providing the runtime environment are loaded into memory and at block 804 at least some of the code for the location-based application is loaded into memory, including code identifying the various components of the application.

At block 806, code for persistent UI components is executed to provide menu bars and other "chrome" that is location-independent. Persistent components other than UI components (e.g., components for accessing network resources, handling user input, etc.) can also be instantiated.

At block 808, at least one location loader is identified in the code. Executable code and data structures for the location loader can be loaded into the memory space for the application as well.

Block 810 represents accessing data specifying a reference to child components for loading via the location loader. For example, the location loader or another component may indicate a default location to be loaded when the location loader is first initialized. As another example, the location-based application may be passed a parameter such as a page ID indicating a desired location to be loaded when the application is initialized, with the location loader configured to look for the parameter when the location loader is initialized. This may allow the application to be loaded to a specific view at launch, such as by including the desired view ID in a URL or HTML reference that launches the runtime environment as noted above.

At block 812, child components for the location are loaded using the location loader according to the default or specified reference. Block 814 represents awaiting a navigation command specifying a new child component. For example, the default location loaded into the location loader may be used for some time as a user retrieves data, provides input, and otherwise interacts with the child components already in memory.

A user or another software component may provide data indicating a new desired location in a navigation request. For example, a user may provide input via a user interface component in a persistent component or within the current location. As another example, an application outside the runtime environment may provide data that is passed to the location loader to request navigation to a new location. When a new location is specified, one or more request parameters may also be specified to pass to the child contents of the new location.

At block 816, after a navigation command is retrieved, the current child contents are removed from memory. In this example, each location is "zeroed out" when a new location is specified and the child is recreated with each navigation. This functionality may reduce errors introduced by child components with memory leaks or other undesired behavior. At block 818 a new child component is loaded using the location loader and program flow returns to 814. Program flow can continue with further navigation commands or can terminate upon an "exit" command to the location-based application or a shutdown of the runtime environment.

In this example, unused child contents are discarded from memory when a new location is requested. However, some embodiments may support caching of previously-loaded child components. For example, the working memory space for rendering content via the location loader may be switched to memory space containing the child components for the new location while the child components for the old location are retained in memory.

Additionally, in some embodiments, the code for the current location may remain in memory while code for the newly-requested location is loaded. This may allow functionality of the existing location to be maintained until the new location is ready, at which point the view can be handed over to the new location and the program components for the old location discarded (or cached).

In some embodiments, method 800 includes background loading and pre-caching of locations other than the currently-selected location independent of navigation actions. For example, after the default location is loaded using the location loader, child components for other locations may be loaded into working memory to reduce transition time when navigation commands specify those locations.

In some embodiments, the location-based application tracks navigation activity. For example, when the source code for the application is compiled, appropriate program code can be included so that a list of previously-rendered locations is maintained while the application is executed. Relative navigation commands such as a "back" and "forward" command provided via respective buttons can thereby be supported by referring to the list of locations. In some embodiments, a cache of history state can be maintained. For example, even if the child components of a location are discarded (ultimately to be re-initialized if the location is visited again), state information such as UI state, scroll positions, and the like can be retained so that a previously-visited location appears in its last-known state when reinitialized.

Some embodiments support transition commands between locations. For example, a fade, wipe, dissolve, or other visual effect and/or one or more sound or other effects may be specified in a navigation command or as a command for navigating to or from a particular location. The effects can be applied to all components in the view, rather than on a component-by-component basis.

In some embodiments, additional code is added to include a progress indicator. For example, a bar or other graphic may be provided when a navigation action begins and may fill or otherwise change until the desired location is fully initialized. The progress indicator may be specified as an optional feature or could be customized by developers.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMs, DVD-ROMs, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
configuring a computing apparatus to load and execute a rich media client application written for use with a runtime environment executed within an operating system;
loading and executing code of a persistent component included in a user interface of the rich media client application, wherein executing the code of the persistent component comprises generating a user interface element corresponding to a navigation command;
accessing, responsive to receiving the corresponding navigation command, a first location component comprising a defined expected parameter and a first child content object comprising executable code;
loading into memory, via a location loader included in the rich media client application, code of the first child content object comprising executable code of a nested persistent component and a nested location loader;
determining that data associated with the expected parameter is present in the memory;
executing the code of the nested persistent component via the runtime environment, wherein executing the code of the nested persistent component comprises generating a nested user interface element;
accessing a second location component comprising a second child content object comprising executable code;
loading into memory, via the nested location loader, code of the second child content object capable of providing a respective view of the rich media client application; and
providing, by the computing apparatus, the respective view of the rich media client application.

2. The method set forth in claim 1, wherein the respective view of the rich media client application is provided prior to loading or executing code of a third location component into memory.

3. The method set forth in claim 1, further comprising:
loading code of a third location component into memory while providing the respective view of the rich media client application.

4. The method set forth in claim 1, further comprising:
receiving an additional navigation command specifying an additional view of the rich media client application; and
providing the additional view of the rich media client application by loading, via the location loader, code of a third location component corresponding to the additional view into memory and executing code of the child content object of the third location component via the runtime environment.

5. The method set forth in claim 4, further comprising:
removing the code of the first and second location components from memory after the additional navigation command is received.

6. A system comprising a processor with access to a non-transitory computer-readable medium tangibly embodying program components, the program components comprising a rich media client application and a runtime environment configured to execute the rich media client application using an application memory space;
wherein the processor is configured to:
execute the runtime environment,
load, into the application memory space used by the executed runtime environment, code of a persistent component included in a user interface of the rich media client application,
execute the code of the persistent component, wherein executing the code of the persistent component comprises generating a user interface element corresponding to a navigation command,
access, responsive to receiving the corresponding navigation command, a first location component comprising a defined expected parameter and a first child content object comprising executable code,
load code of the location loader into the application memory space,
execute the code of the location loader to load code for a first child content object comprising executable code of a nested persistent component and a nested location loader into the application memory space,
determine that data associated with the expected parameter is present in the application memory space,
execute code of the nested persistent component via the runtime environment, wherein executing the code of the nested persistent component comprises generating a nested user interface element,
access a second location component comprising a second child content object comprising executable code,
load into the application memory space, via the nested location loader, code of the second child content object capable of providing a respective view of the rich media client application, and
provide the respective view of the rich media client application.

7. The system set forth in claim 6, wherein the respective view of the rich media client application is provided prior to loading or executing code of a third location component into the application memory space.

8. The system set forth in claim 6, wherein the nested location loader is further configured to, while the respective view is provided, load code of a third location component into the application memory space.

9. The system set forth in claim 6, wherein the processor is further configured to:
access data identifying an additional navigation command requesting an additional view of the rich media client application, wherein the data identifying the additional view of the rich media client application is accessed in response to input specifying the additional navigation command via the user interface element of the persistent component;
load code for a third location component corresponding to the additional view into the application memory space via the location loader; and
execute code of the child contents of the third location component via the runtime environment to provide the additional view of the rich media client application.

10. The system set forth in claim 9, wherein the location loader is configured to remove the code of the first and second location component from the application memory space after the additional navigation command is received.

11. A non-transitory computer-readable medium tangibly embodying program code, the program code comprising:
program code defining a rich media client application;
program code for loading and executing code of a persistent component included in a user interface of the rich media client application, wherein executing the code of the persistent component comprises generating a user interface element corresponding to a navigation command;
program code for accessing, responsive to receiving the corresponding navigation command, a first location component comprising a defined expected parameter and a first child content object comprising executable code;

program code for loading into a memory, via a location loader included in the rich media client application, code of the first child content object comprising executable code of a nested persistent component and a nested location loader;

program code for determining if the expected parameter is present in the memory;

program code for executing the code of the nested persistent component via the runtime environment, wherein executing the code of the nested persistent component comprises generating a nested user interface element corresponding to a second navigation command;

program code for accessing a second location component comprising a second child content object comprising executable code;

program code for loading into memory, via the nested location loader, code of the second child content object capable of providing a respective view of the rich media client application;

program code for providing, by the computing apparatus, the respective view of the rich media client application.

12. A method of application development, comprising:

receiving input via a computing apparatus and defining code for a persistent component included in a rich media client application under development, the defined code for the persistent component capable of generating a user interface element corresponding to a navigation command;

receiving input via the computing apparatus associating code elements with a plurality of respective location components;

receiving input via the computing apparatus defining code for a plurality of child content objects;

receiving input via a computing apparatus and defining code for a location loader, the defined code for the location loader capable of loading into memory the code elements associated with a first location component, and further capable of determining if data associated with a defined expected parameter is present in memory;

wherein:

the first location component is navigable to in response to the navigation command, and the first location component is associated with code elements for a first defined expected parameter and a first child object;

the first child content object defines code for a nested persistent component and a nested location loader, the code of the nested persistent component capable of generating a nested user interface element, and the code of the nested location loader capable of loading into memory the code elements associated with a second location component; and the second child content object defines code capable of providing a respective view of the rich media application;

parsing the code elements of the rich media client application under development to identify the navigation command and the respective code elements associated with the plurality of location components; and generating executable code and storing the executable code in a computer readable medium so that when the code stored in the computer readable medium is executed by a computing device, the computing device generates the user interface element, loads a code element associated with a first and second location components to provide the respective view of the rich media application, and determines if the first defined expected parameter associated with the first location component is currently in memory.

13. The method set forth in claim 12, wherein the code, when executed, provides the location loader that is responsive to the navigation command to load the respective code elements of the first location component.

14. The method set forth in claim 13, wherein the location loader is configured to remove a code element of the first and second location components from memory in response to an additional navigation command.

15. The method of claim 1, where the location component defines a container for the first child content object.

16. The method of claim 12, wherein location components in the rich media client application enables a developer to reuse executable code contained in the plurality of location components.

17. The method of claim 1, wherein the first and second location components are defined in source code files separate from the location loader.

18. The method set forth in claim 1, further comprising:
responsive to receiving an additional navigation command corresponding to the nested user interface element, accessing a third location component comprising a third child content object comprising executable code;
loading into memory, via the nested location loader, code of the third child content object capable of providing an additional view of the rich media client application; and
providing, by the computing apparatus, the additional view of the rich media client application.

* * * * *